Aug. 13, 1968 L. V. GEWISS 3,397,261
PROCESS AND DEVICES FOR CHEVRONING PLIABLE SHEET MATERIAL
Filed Oct. 11, 1963
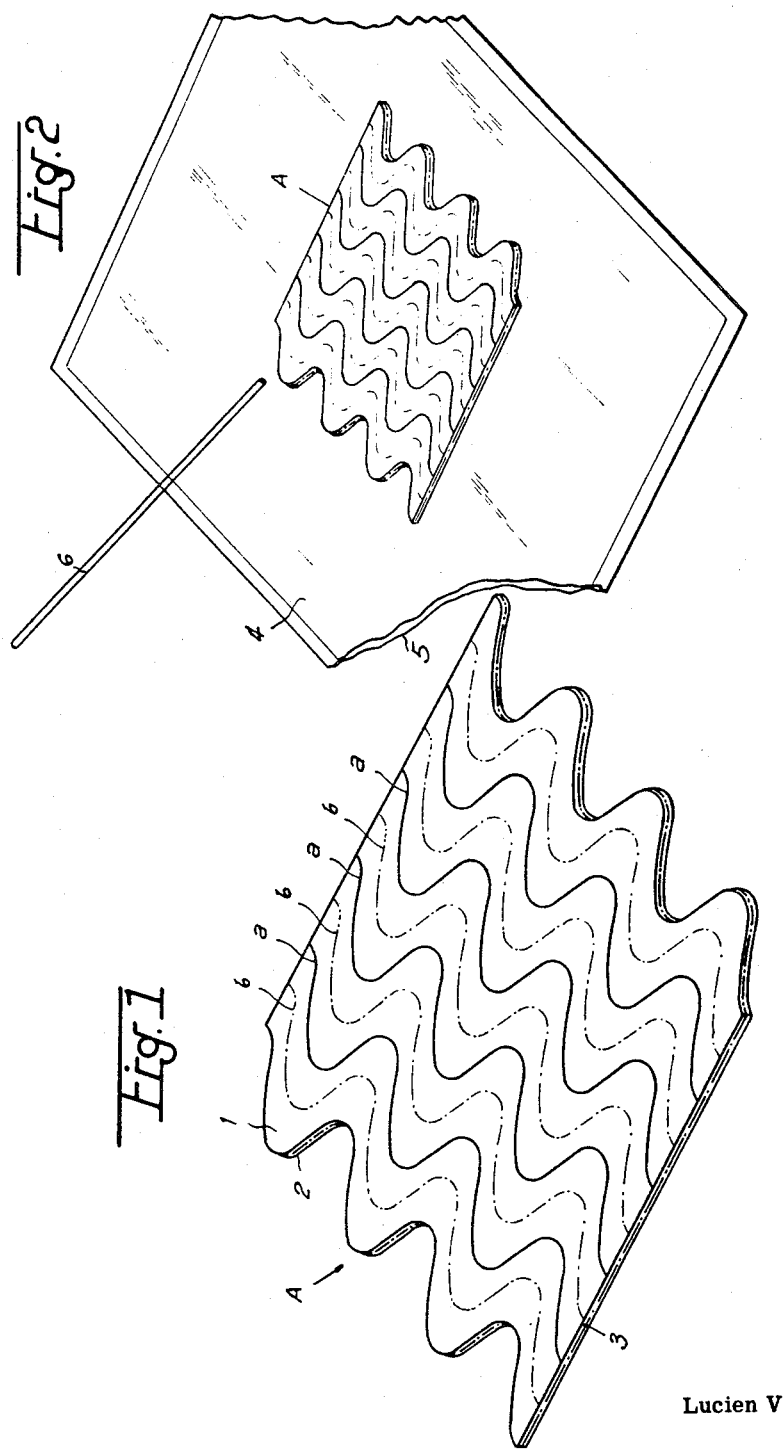
Inventor
Lucien Victor Gewiss

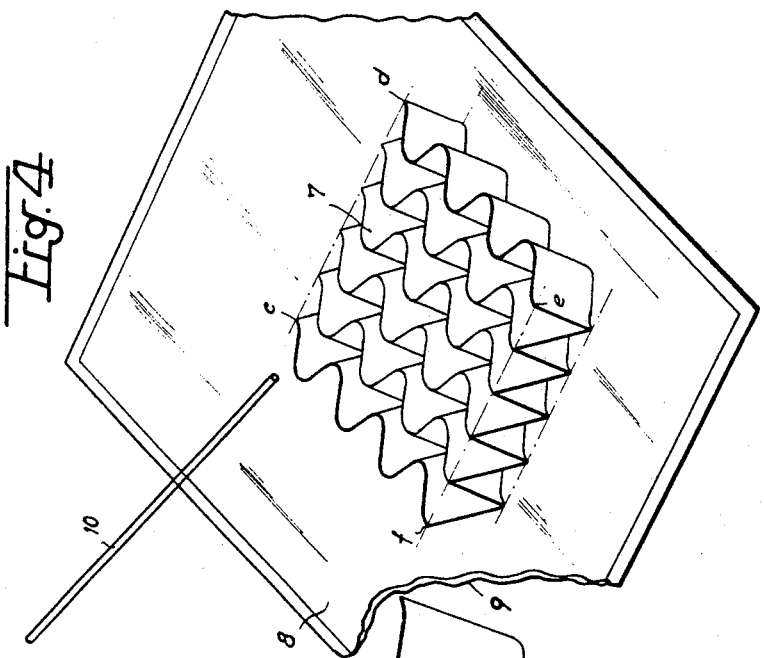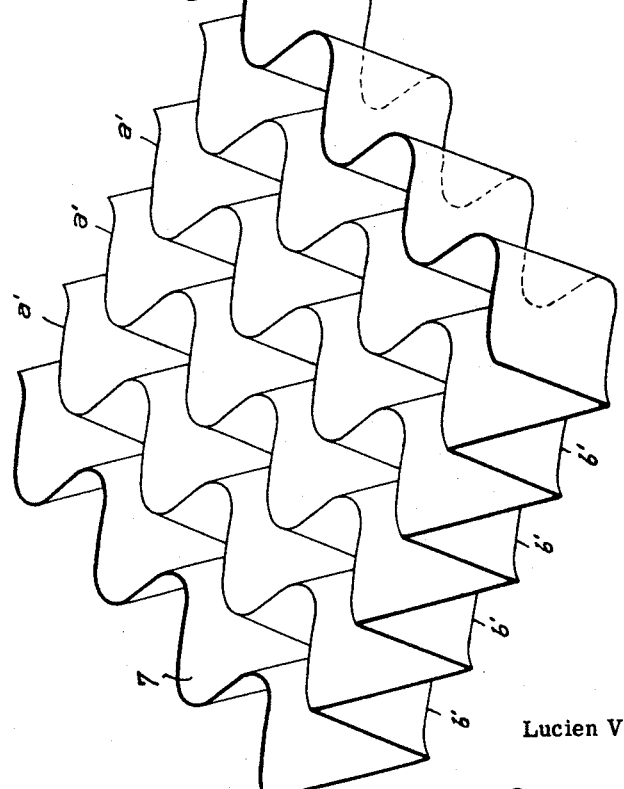

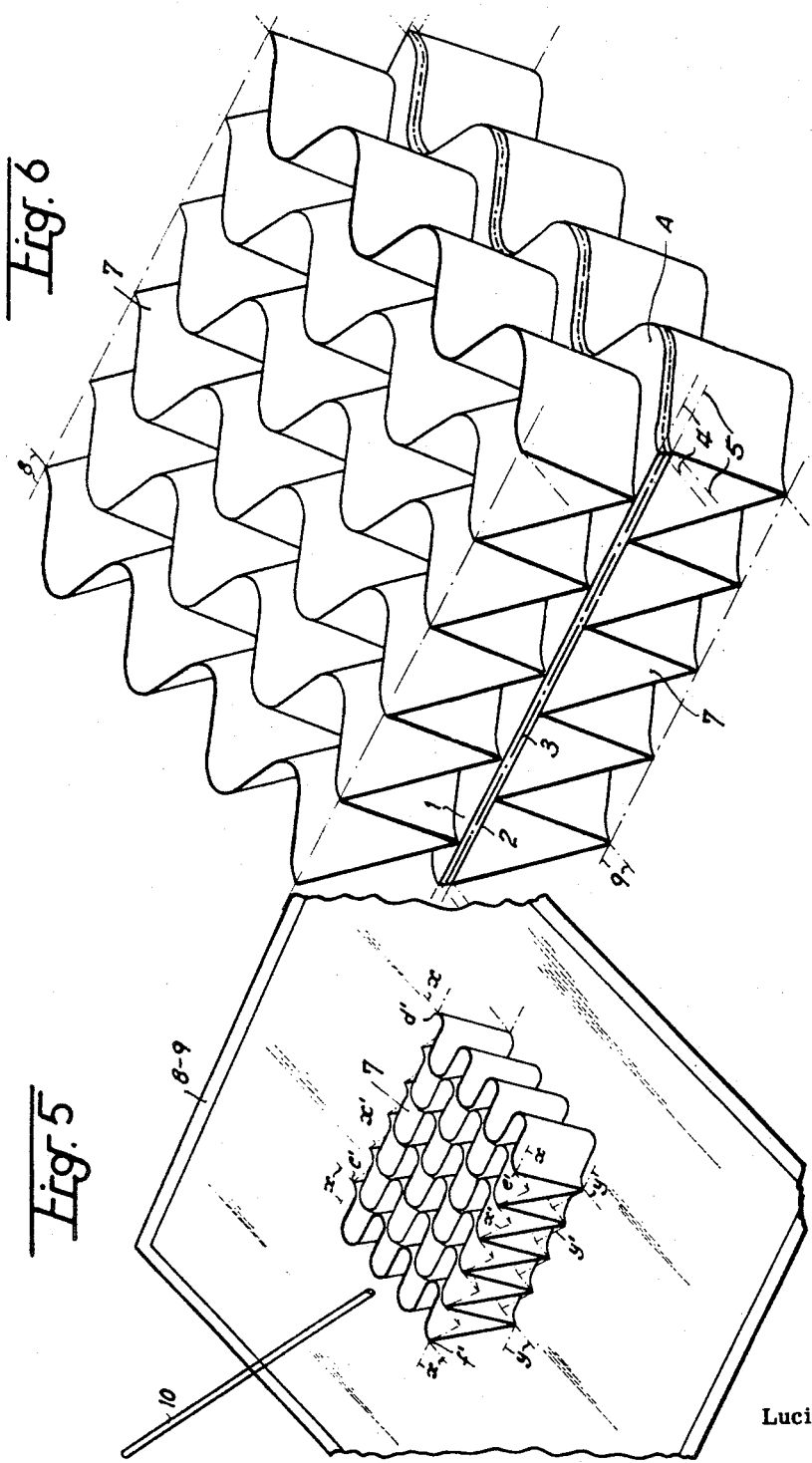

Aug. 13, 1968 L. V. GEWISS 3,397,261
PROCESS AND DEVICES FOR CHEVRONING PLIABLE SHEET MATERIAL
Filed Oct. 11, 1963 10 Sheets-Sheet 4

Inventor
Lucien Victor Gewiss

By Lane, Aitken, Dunner & Ziems

Attorneys

Aug. 13, 1968 L. V. GEWISS 3,397,261
PROCESS AND DEVICES FOR CHEVRONING PLIABLE SHEET MATERIAL
Filed Oct. 11, 1963 10 Sheets-Sheet 5

Inventor
Lucien Victor Gewiss

By Lane, Aitken, Dunner e Ziems
Attorneys

Aug. 13, 1968         L. V. GEWISS        3,397,261
PROCESS AND DEVICES FOR CHEVRONING PLIABLE SHEET MATERIAL
Filed Oct. 11, 1963

Inventor
Lucien Victor Gewiss

Aug. 13, 1968  L. V. GEWISS  3,397,261
PROCESS AND DEVICES FOR CHEVRONING PLIABLE SHEET MATERIAL
Filed Oct. 11, 1963  10 Sheets-Sheet 7

Inventor
Lucien Victor Gewiss

By Lane, Aitken, Dunner & Ziems
Attorneys

Fig. 12
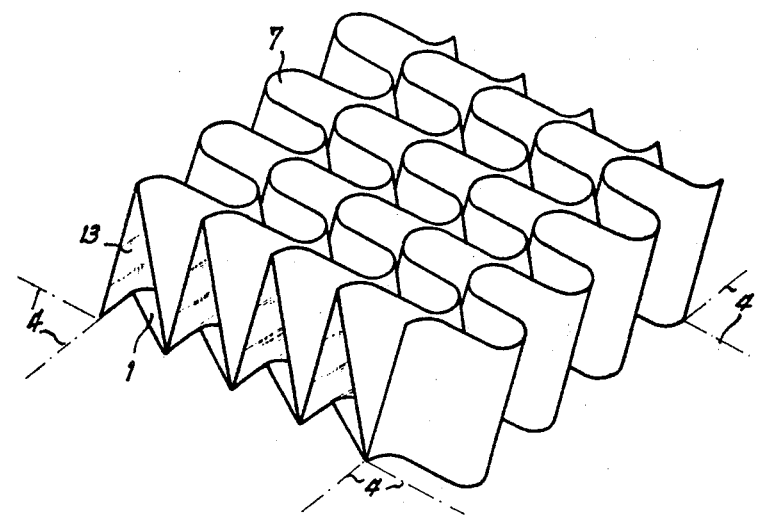
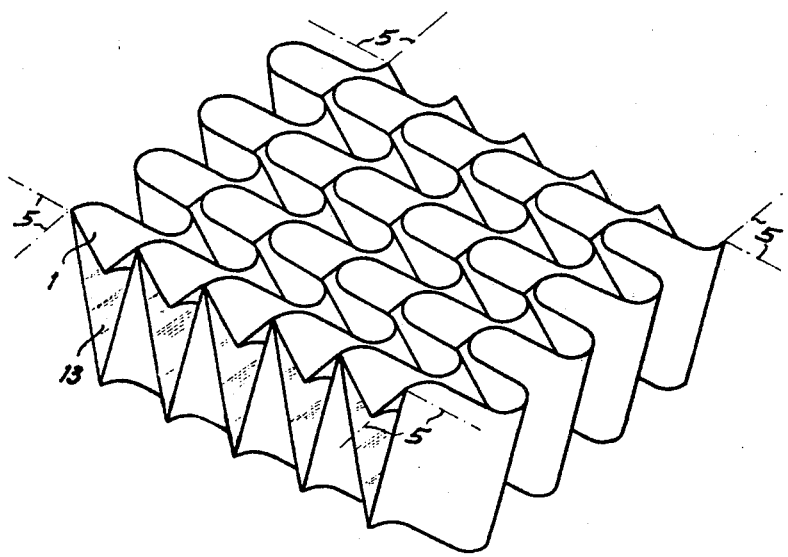

Inventor
Lucien Victor Gewiss

Aug. 13, 1968 — L. V. GEWISS — 3,397,261
PROCESS AND DEVICES FOR CHEVRONING PLIABLE SHEET MATERIAL
Filed Oct. 11, 1963 — 10 Sheets-Sheet 10

Inventor
Lucien Victor Gewiss

By Lane, Aitken, Dunner & Ziems
Attorneys

United States Patent Office 3,397,261
Patented Aug. 13, 1968

3,397,261
PROCESS AND DEVICES FOR CHEVRONING PLIABLE SHEET MATERIAL
Lucien Victor Gewiss, Ville-d'Avray, France, assignor to Marc Wood Societe Anonyme pour la Promotion des Echanges Techniques Internationaux, Paris, France, a company of France
Filed Oct. 11, 1963, Ser. No. 315,618
20 Claims. (Cl. 264—89)

ABSTRACT OF THE DISCLOSURE

Method and apparatus for chevroning pliable material into an undulating three dimensional pattern. Apparatus for practicing the invention comprises a contractible chevroned structure. The pliable material is positioned against the contractible chevroned structure or sandwiched between contractible structures; and then the assembly is deformed. Force is applied to the assembly by vacuum or other force applying means which contracts the structure to form a three dimensional chevroned configuration.

---

The present invention relates to a process and to novel means of making in a simple, accurate, effective and economical way chevroned structures of all shapes out of pliable sheet material regardless of its nature and dimensions. This invention contemplates more particularly the production of developable chevroned structures such as are described in applicant's copending application Ser. No. 514,171, filed June 9, 1955, but it can also be applicable to the making of certain simple or complex pleats.

In said copending application Ser. No. 514,171 (which is hereby incorporated by reference herein and which is based upon French Patents 1,106,780, issued July 27, 1955; 66,807, issued Mar. 25, 1957; 67,078, issued May 13, 1957; and 68,479, issued Nov. 12, 1957) is described a novel type of material having a "chevroned" configuration which, in its more general appearance, has the form of a structure folded from a flat sheet or band whose folds, located alternately in one and then another limiting plane, are zig-zag or corrugated lines. As pointed out in said copending application, such chevroned structures have a configuration such as to present a succession of alternate protrusions and recesses, the walls of each such protrusion and recess being composed exclusively of elementary surfaces joining each other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°. (When used hereinafter in this specification and claims, the term "chevron structure" or "chevroned structure" shall be construed to have this definition.) The surfaces of this novel structure may be planar or curved in configuration, or both, but in all cases the structure meets the limitations set forth above. As is set forth in said copending application, one of the peculiar characteristics of the chevroned structure is that its surface is in actuality the materialization of a more or less complex geometric configuration which is developable along a plane (although the structure itself is not necessarily effectively developable).

The advantages of such chevroned structures are many and varied. For example, the fact that the chevroned structure is geometrically developable in form makes it possible to form such structure solely by means of folding operations performed on flexible (though not necessarily extensible) materials at extremely low cost. And due to the almost complete lack of deformation of the materia as a result of such folding operation, the material may be formed through a much greater angle than would be the case with conventional forming techniques withou significant danger of rupture of the material. This advan tage would alone make the novel chevroned structure; of applicant's copending application extremely significan and advantageous in and of itself. Still additional advan tages of such structures are disclosed in said copending application.

Quite a number of forming processes are already known which make it possible to make varied structures of thi type. Among these processes, those which tend to insure chevroned forms which are free of substantial defect; make it necessary to apply particularly costly machine; whose operation is delicate and often precarious.

Certain methods of forming pliable sheet material; are also known which are inspired from the textile pleat ing industry and according to which molding means are used consisting of two identical deformable assemblie; comprising, in the exact image of the structure to be produced, elementary surfaces which are more or less rigid and connected together by flexible linkages, the two assemblies being designed to be superimposed so tha they can be formed simultaneously.

Molds of this type seem, a priori, to be very satis factory. Nevertheless, though they might make it possible to obtain certain limited results by utilizing molds whose two useful parts are, for example, made of strong pleated paper, it is certain that this can only be as a result o an uncommon manual dexterity and on condition tha only a very approximative uniformity of form is sought The difficulties become insurmountable as soon as the sheet to be chevroned becomes large in area and is no longer of great pliability because of its nature or thickness Molds of this type, in effect, require the operator to have skill, the possibility and the strength of progressively and simultaneously forming between his ten fingers the entirety of the pleats of the surface to be chevroned without his action unintentionally permitting the intimate contact to be interrupted, at all points, between the two parts of the mold on the sheet being formed. Since the points which have to be grabbed to exercise the folding force manually can only be located on the ridges and the elementary surfaces of the flanks, it is impossible, during the manipulations, for the operator to avoid producing numerous deformations, even when his action is limited to the forming of very small surfaces with a view toward obtaining chevroned articles of small dimensions, for example.

In order to avoid as much as possible the deformation of the elementary surfaces of the molds, it was contem plated making their two deformable parts of rigid metal elements, connected by hinges. To tell the truth, this design can only be imaginary since the mechanical hinges comprise material axes which precisely occupy, on the two parts of the mold, the lines along which the chevron ing of the sheet to be formed must take place. An advance in the manufacture of this sort of mold was undoubtedly achieved when the idea was had of stiffening the ele mentary surfaces comprised between the pleats of a soft pliable material, such as paper or an appropriate plastic material, by applying to these surfaces mechanically rigid surfaces of metal or the like. Polypropylene which can be folded innumerable times along the same line without tearing made it possible to make molds of the type in question which were completely satisfactory.

Unfortunately, the improvement of the molds does not overcome the difficulty of applying to the pleats the perfectly coordinated relative movements and the motive power which are necessary to produce the chevroning. For example, if one considers the sandwich constituted by the sheet of material to be formed which is positioned flat between the two parts of a mold assumed to be as perfectly executed as is desirable, it can be understood that in order to obtain the desired result, one must satisfy simultaneously the three following principal requirements:

(1) Maintain, during the entire chevroning process, the intimate contact and the accurate positioning, without any sliding, which existed at the beginning between all of the points and all of the folds of the three parts of the sandwich.

(2) Insure that the various alternate folds of the sandwich take their initial shape and rise, some in one direction, the others in the opposite direction, by equal amounts.

(3) Uniformly apply and distribute the motive forces necessary for folding, so that the chevroning accentuates itself equally at all points of the sandwich, despite the relative movements of amplitude and in varied directions which take place along the three geometric axes between the ridge lines of the folds and between the elementary surfaces that these ridge lines bound.

In addition, it is quite naturally necessary that the arrangements which satisfy these three requirements do not hinder, at the end of the operation, the production of the opposite effects which are necessary for extracting the chevroned sheet from the two parts of the mold and for preparing the latter to receive a new sheet to be chevroned.

The various solutions which could be contemplated for realizing in practice the accurate and the very complex movements related to the rising of the folds of the two parts of the mold led to an attempt to make articulated mechanical assemblies of inordinate complexity. Indeed, the movements which must be imparted along the three geometric axes to the movable parts impose kinematic requirements which leave no material place for the support or the linkages which impose the transmission of useful power.

The new chevroning process and the devices for putting this process into practice which are the subject of the present invention were conceived to make possible the manufacture in a remarkably simple and inexpensive way high speed, accurate and effective forming assemblies, which require no particular manual skill nor effort on the part of the operator and which are not limited either in area or in form. Toward this end, the invention is based on a characteristic property of developable chevroned structures, regardless of their complexity, but which is, however, set forth in what follows only as it relates to structures comprising broken or undulated ridge lines whose paths are in the form of parallel networks in the chevroned structure when it is developed flat onto a plane.

For developable chevroned structures of this type, with parallel faces, this property can be stated as follows:

On a flat surface of any size but which is well defined in which are inscribed all of the ridge lines of one of the two faces of a parallel faced developable chevroned configuration which has been developed onto a plane, it is always possible to raise from these ridge lines as many developable chevroned configurations distinct from the first one as desired, by locating the upper flat faces of these various configurations and the ridges which these faces contain at different heights with respect to the aforementioned flat surface.

The elementary figures which compose the facets of chevroned configurations having broken ridge lines thus constituted are, indeed, always parallelograms of which alternate pairs are equal and symmetrical. Regardless of the height of the facets of such configurations, the two angles located on each of these parallelograms at each of the breaks in the ridge lines obviously have 180° as the sum of their respective values. Since the angles are in neighboring parallelograms, alternate pairs of which are equal and symmetrical, the sum of the four angles which concur at each of the points where the ridge lines break can therefore only be 360°. Therefore the configurations thus constructed are indeed developable.

Naturally, the preceding demonstration applies to configurations with undulated ridge lines since the curved surface of the facets of such structures is the limit of adjacent parallelepiped shaped elementary surfaces whose narrowness has been reduced to their ruled generating line.

Taking into consideration the foregoing, it is clear that from either side of a flattened out sheet of chevroned structure of the type in question it is possible to raise all along the path of the ridge lines which correspond to concave folds a developable chevroned structure whose facets are higher than those of the facets of the first structure and formed between them angles of a predetermined value.

What is remarkable is that an assembly constituted by a flattened chevroned structure of broken ridge lines, when maintained in a sandwich between two higher chevroned structures constituted as has just been indicated, lends itself—the three structures being assumed without thickness—to be contracted in the two rectangular directions of its mean plane until the elementary surfaces composing the facets of the three structures occupy a contiguous position without the contacts which were initially provided all along the ridge lines and the breaks in them being broken or even affected in any way.

During the contraction of the folds, the broken ridge lines of the two faces of the intermediate structure undergo in effect variations in the angle of the breaks in the ridge lines which are, for the reasons indicated above, strictly the same as those of the breaks in the ridge lines of the two enveloping structures despite the fact that these latter have higher facets.

The contraction of an assembly constituted by two developable configurations with undulated ridge lines sandwiching between them a flattened configuration which is less high so that all of the ridges of the three structures coincide takes place in exactly the same conditions. The curved surfaces of the facets, however, cannot in this case finally come into contiguous contact. The progression of the contraction is stopped at the exact moment where the curved surfaces of the facets facing each other come together along a tangent contact. Indeed, as was explained in the text of said copending application, there is the formation at this point of an immobilization block.

It is this peculiarity of coinciding along their whole length which the ridges of the folds of several geometric configurations associated in a common contraction have which is exploited according to the present invention in order to apply and transmit the motive energy necessary for the forming of structures of chevroned material, despite the movement along the three geometric axes of the elementary surfaces inserted between them.

Starting with the foregoing considerations, the chevroning process which is the subject of the present invention consists essentially of arranging the pliable sheet to be formed on one of the flat surfaces of at least one deformable assembly, whether opened or closed, constituted by a contractible chevroned structure whose ridge lines coincide with those of the chevroned structure to be formed but whose facets are higher than those of the latter, and of subjecting this assembly to a contraction either through the effect of varying the pressure of a fluid or else by the action of mechanical forces exerted simultaneously on the walls or the ridges of the said assembly.

This process lends itself to various methods of reduction to practice.

According to a first method of execution, the sheet to be formed is placed between two perfectly flattened out, thin, deformable chevroned structures identical to that which is to be formed. These two structures constitute two parts of the deformable mold which will make it possible to chevron. They will hereafter be referred to as "molding structures."

In order to apply contiguously the folds of the sandwich thus realized, it is inserted in a bag of flexible but hardly stretchable plastic material (nylon sheet or hard rubber sheet for example). After having hermetically sealed this bag, a vacuum which is as strong as necessary is created inside it. Under the effect of the vacuum, the sandwich naturally assumes a strictly flat shape.

In order to contract the folds of the flat sandwich thus realized, it is itself placed as a sandwich between two higher chevroned structures built as explained above, in such a way that the ridge lines of the four structures coincide, and the entire assembly is inserted in a second plastic bag larger than the preceding one which is hermetically closed at its edges. The two higher structures will be hereafter called "motive structures."

A vacuum is then created inside the enveloping bag. As soon as this vacuum manifests itself, each of the two sheets of which the enveloping bag is constituted finds itself applied by atmospheric pressure along the whole length of the ridges of the two outside faces of the two motive structures. Because of the rigidity of the facets of each of these structures, the entire applying force is transmitted to the ridges of their two inside faces. In this way, the ridges of the sandwich of the molding structures are in close contact with the sheet to be formed and remain so.

The progressive increase in the vacuum which is then created has the effect not only of increasing the thrust of the motive structures toward and parallel to each other, and consequently of hollowing out under their two inside faces the concave ridge lines of the two faces of the molding structure and of requiring them, in this way, to assume the chevroned shape, but also of hollowing out between the ridge lines of the two outside faces of the motive structures the elementary surfaces between ridges of the two sheets of the bag according to a chevroned shape which can only be, for reasons of symmetry, exactly that which the molding sandwich assumes.

In short, under the effect of atmospheric pressure the enveloping bag, whose two sheets bear on the ridges of the six faces of the connected deformable motive structures which it encloses, progressively reduces itself in volume while constraining the constituent facets of the various incorporated structures to contract together parallel to each other. This reduction in volume which is produced follows movements whose trajectories result from the articulated system which connects the facets and determines the chevroning of the sheet of material to be formed which has been inserted in the median region of the assembly.

It is important to note that the movements of the assembly which are involved are possible only because chevroned structures consist of developable configurations whose geometric shape lends itself to resisting the forces applied in all directions to its facets by the atmospheric pressure without any notable deformation or buckling.

When the contraction has attained its desired value, the progression of the vacuum is halted and atmospheric pressure is reestablished. The chevron structure is then extracted successively from the bags as well as from the motive and molding structures.

According to a second method of executing the process which is the subject of this invention, the two molding structures are eliminated as well as the pneumatic bag which enclosed them and one proceeds as above by placing the sheet of pliable material to be formed directly between the two motive structures after being careful, however, to spread out the folds of these latter so that they are strictly equal to the dimensions of the desired chevroning.

According to a third method of executing the process, a pliable sheet to be formed is placed on each of the two faces of the motive structure spread out to the suitable dimension and the combination is inserted into a bag consisting of sheets of flexible material. The bag is hermetically closed and a vacuum is created inside it. The two main sheets of the bag more or less play the role of molding structures in this case.

According to a fourth method of execution, a molding structure and a motive structure are combined by connecting all of the ridges between them which are in contact and then closing the triangular free spaces comprised laterally between these two structures by gluing on a strip of flexible plastic sheet. A deformable fluid-tight box is thus constituted which can be inflated, as desired, until the molding structure is spread out flat or which can be contracted by vacuum until all of the folds are in contiguous contact.

Two similar boxes are combined by causing their molding surface to adhere in their entirety on the outside faces of the two sheets of the same bag. Thus we have a deformable forming assembly which is utilized as follows:

The sheet to be formed is inserted inside the bag which connects the two molding structures of the two deformable boxes which have been inflated to a low pressure and a vacuum is created inside the bag which has been hermetically closed. Then the pressure inside the two deformable boxes is replaced by the vacuum. The contraction of the assembly takes place. The buildup of the vacuum is stopped as soon as the contraction has attained the desired degree.

By admitting air into the three spaces constituted by the bag and the two boxes, the formed structure can be extracted and the two boxes can be re-extended to their maximum by inflation, i.e., to the condition where a new operation can be begun.

The various methods of application set forth above are given only by way of example and it is certain that the various chevroning principles which they apply can be combined in as varied ways as is necessary without departing from the scope of the invention.

For example, by inserting in the deformable assemblies described above not one sheet but several sheets of pliable material placed one on top of the other it is possible to obtain several chevroned structures which have been formed at the same time if the thickness and the nature of the material permit it.

Along another line, it can be understood that the contraction of the structures produced by an internal vacuum can just as well be produced under the effect of an external pressure. It suffices, in effect, to insert the assembly to be contracted into a resistant caisson inside which a fluid pressure is applied after the caisson is closed. By the action of such a pressure, we naturally find ourselves in a position to transmit to the motive structures a forming force which is considerably higher than can be achieved by the effect of a vacuum.

If it is necessary to use a forming force which is still greater, a purely mechanical thrust can be added to the pneumatic effects which is exerted directly on the ridges of the outside faces of the motive structures. For example, by placing any of the chevroning assemblies described above between the two flat faces of the platens of a press of suitable capacity, it is possible, at least in principle, to materially add to the pneumatic pressure exerted on the location of the future ridges of the sheet to be formed a direct thrust which is as large as desired.

In practice, however, the additional force exerted in this manner on the section of facets of the motive structures will be limited by the resistance in compression along its plane of the sheet material of which the facets are made. In order to overcome this difficulty in this case, one uses not the section of oblique facets to transmit the mechanical forces but the section of flexible or transversely articulated metal strips which occupy the broken or undulated median plane of the facets of each motive structure, i.e., of strips capable of assuming and retaining as their profile the changing design of the ridge lines of the structure being formed, these strips being arranged in such a way that their surface is perpendicular to the plane of the ridge lines of the structure to be formed and that their lower edges coincide with the said ridge lines.

In order that it be the sections of chevroning strips themselves and not the ridges of the facets of the motive structure which receive the thrust of the platen of the press and transmit it directly to the sheet of material to be formed, the motive structure which support and articulate these strips can be arranged so that their linkages are clearly disengaged from the sections of the strips. This method of proceeding makes it possible to connect the facets of the motive structures to the strips by means of mechanical articulations along at least two planes of their height.

Naturally, the action of the press on these strips can only be performed, under such conditions, in a discontinuous manner. The articulated assembly must be allowed to straighten itself out between each new advance in the progression of the chevroning in order to reestablish the perpendicularity of the strips which has been slightly altered after each penetration.

Indeed, during the forming, the section of each strip which hollows out a furrow in the sheet to be chevroned locks itself into the furrow. Its profile is therefore modified and its position is moved parallel to itself exactly to the image of the fold which forms. The opposite section of the strip, which is in non-sliding contact with the platen of the press, is, on the other hand, all the more immobilized under the effect of the thrust it receives, since no substantial stress of movement tends to disengage it. It is possible, during the forming, to maintain the strips in a perpendicular position by making their sections slide sideways an appropriate amount on the platen of the press.

The foregoing will become more apparent upon reference to the ensuing description, claims and appended drawings. It is to be noted that the examples hereinafter illustrated and described relate to the forming of chevron structures having undulated ridge lines, these having been chosen as preferable to structures with broken ridge lines because they more perfectly represent the general case. It should be clearly understood, however, that the invention applies, under similar conditions, to the forming of chervon structures having broken ridge lines.

In the drawings:

FIG. 1 represents in perspective two molding structures having undulated ridge lines which have been flattened out on either side of a sheet of pliable material to be chevroned.

FIG. 2 represents in perspective, on a smaller scale, the same assembly inserted between two sheets of a bag of flexible plastic material, which has been assumed to be perfectly transparent and hermetically closed, inside of which a certain vacuum has been created.

FIG. 3 represents in perspective a motive structure contracted in such a way as to present on its upper face ridge lines capable of coinciding with the lower concave undulated ridge lines of the structure represented in FIG. 1.

FIG. 4 represents in perspective the motive structure of FIG. 3 located inside the hermetically sealed bag of flexible and transparent plastic material inside of which the vacuum will be created.

FIG. 5 represents in perspective the contracted shape that the structure in FIG. 4 assumes as well as the sheets of plastic material constituting the bag after the vacuum inside the latter has been pushed to a certain value.

FIG. 6 represents in perspective the assembly inside the bag consisting of the flat sandwich of FIG. 1 which is under vacuum, on both sides of which has been placed a motive structure with the same undulated ridge lines as in FIG. 3 before the vacuum has been applied.

FIGS. 11 and 12 represent in perspective, respectively extended and contracted, two fluid-tight stretchable boxes each consisting of a molding structure and a motive structure.

Figure 8:
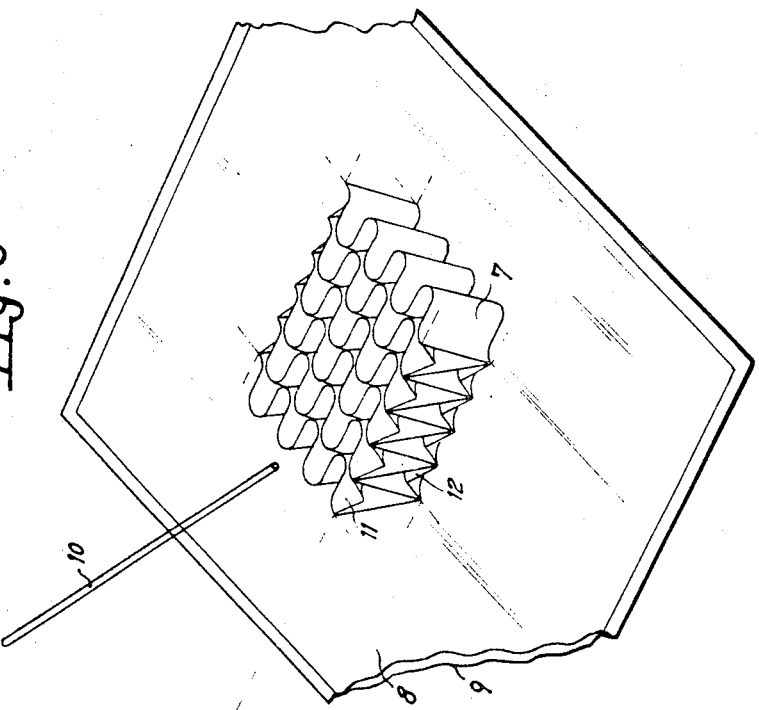
FIG. 8 represents in perspective a contracted assembly in accordance with FIG. 5, in which appear perfectly chevroned two sheets of material which had been inserted previously between the sheets of the bag before the vacuum was created in it.

In FIG. 1 there have been represented in perspective two flattened out chevroned molding structures 1 and 2 comprising identical undulated ridge lines $a$ and $b$, the two molding structures holding between them a sheet 3 to be chevroned which has been cut out to the same contour as the two molding structures. The ridge lines $a$ correspond here to the convex folds of the structures and the lines $b$ to the concave folds.

This representation is purely theoretical. Indeed, in practice, folds $a$ and $b$ retain a certain elasticity such that the structures cannot be completely flattened out without an appropriate artifice. It is the application of the artifice contemplated for this purpose by the invention which is represented in FIG. 2 where the sandwich of FIG. 1 can be seen at A, drawn to a smaller scale, and which is located inside a bag consisting of two superimposed sheets of flexible and transparent material out of which a hermetic assembly has been made, for example, by simply folding the four edges back on themselves. A tube 6 of plastic material, connected to a vacuum machine which is not shown, is inserted in a fluid-tight manner inside the bag to enable the vacuum to be created between the two sheets of the bag.

As soon as the vacuum begins to be drawn on the bag, the four edges which have been folded back on themselves stick to each other in a fluid-tight manner and the assembly stretches itself out completely flat provided, however, that the necessary smoothing action is exerted through the bag so that ridges $a$ and $b$ of the two molding structures 1 and 2 slide properly on the two faces of the sheet 3 to be chevroned. If this smoothing action is not very uniformly exerted, the molding structures 1 and 2 would partially behave more or less perfectly in the same way as a motive structure, as will be understood from what is said below (FIGS. 3 and 4).

FIG. 3 shows in perspective a chevroned motive structure 7 designed to be applied in conjunction with the above described molding structures. It can be imagined to be made, for example, from a thin sheet of polypropylene. This motive structure comprises facets which are higher than those of the molding structures 1 and 2 but, in the contracted state they are now in, the various ridges of folds $a'$ of its upper plane have exactly the same shape and occupy the same position as ridges $b$ in the lower face 2 of the sandwich represented in FIG. 1. In the lower plane of structure 7, ridges $b'$ have the shape and the arrangement of ridge lines $a$ of the upper face 1 of the said sandwich.

In FIG. 4, there can be seen, on a smaller scale, the foregoing structure 7 located between two sheets of flexible and transparent plastic material 8 and 9 with their edges folded back to form a fluid-tight bag. A tube 10 connected to a vacuum pump makes it possible to draw a vacuum inside the bag in order to cause atmospheric pressure to intervene at the periphery of the assembly.

In FIG. 5, there can be seen the same assembly with its folds contracted under the effect of atmospheric pressure, a result of the progressive vacuum drawn between the two sheets 8 and 9 of the bag.

By reason of the fact that the contraction of the folds of the structure has the effect of ruffling the bag over its entire area, its representation outside of the surfaces of the structure is symbolic and was intentionally limited to simplify the dot-dash lines such as $x$ on the upper face and $y$ on the lower face. On both faces of the structure, sheets 8 and 9 of the bag are seen firmly applied and caught to the ridges of the structure as soon as the vacuum has begun to take effect. Over the entire extent of the faces, the sheets are therefore not ruffled as they are everywhere else. Along with the movements of the ridges, the sheets have necessarily chevroned themselves very uniformly.

Surface $c\ d\ e\ f$ of flattened upper sheet 8 in FIG. 4 has therefore become, in FIG. 5, the chevroned surface of equal area $c'\ d'\ e'\ f'$. The ridges which can be seen in the figure are, at the same time, the ridges of polypropylene structure 7 which can be seen by transparency and the transparent ridges of the sheets themselves. The dot-dash lines $x'$ are the lateral ridges of this structure. Similarly, the dot-dash lines $y'$ are the chevroned lateral ridges of the lower sheet.

In FIG. 6 there is represented an assembly consisting of the sandwich A of FIG. 2 inside a bag, on each of the two faces of which a motive structure 7 has been placed identical to the structure represented in FIG. 3. The entire assembly has been placed inside a second bag. The two sheets 4 and 5 of the internal bag have been schematically represented as well as the two sheets 8 and 9 of the outside bag by dot-dash lines hooked to the angles of the structures as in the preceding case.

Figure 7:
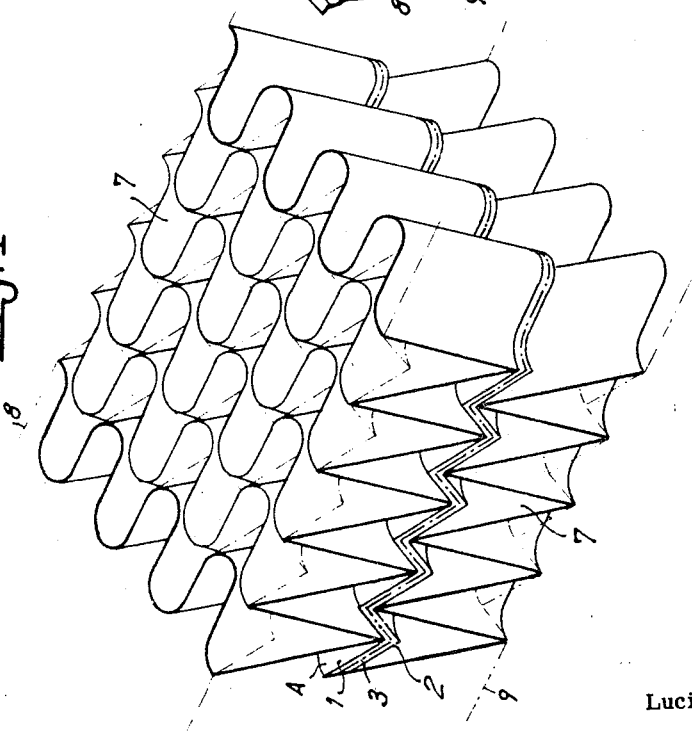
FIG. 7 represents in perspective the same assembly contracted after application of a certain vacuum.

FIG. 7 shows what the assembly becomes when it is contracted under the effect of atmospheric pressure after the preliminary vacuum of the inside bag, intended to flatten the two molding structures onto each of the faces of the sheet 3 to be chevroned, has been followed by a certain vacuum created inside the second outside bag 8 and 9. Under the pressure applied to their ridges, the motive structures 7 which face each other have penetrated into each other to the extent permitted by molding sandwich A inserted between them.

The ridges of the faces of the two motive structures 7 have drawn together exactly in the same manner in the two rectangular directions of the mean plane of the assembly, since they have been solicited by the molding sandwich A of the central part, as well as by the two sheets of the bag, the sandwich and the sheets having identical and similarly located ridges and configurations. The dot-dash lines 8 and 9 represent the visible contours of the facets of the two chevroned sheets of the outside bag, which contours appear in particular on the facets of the motive structures. Naturally, sheet 3 held between the two molding structures of sandwich A is, at this point of contraction, perfectly chevroned.

FIG. 8 is similar to FIG. 5 previously described, but it concerns a method of executing the process according to the invention in which two sheets of pliable material 11 and 12 are held, on either side of a single motive structure 7, between the two sheets of flexible plastic material 8 and 9 of a bag which encloses the entire assembly. In this bag is inserted, as previously, a tube 10 connected to a vacuum pump. The two pliable sheets 11 and 12 are then chevroned along with sheets 8 and 9 themselves when the atmospheric pressure acts as a result of the vacuum created between the inside faces of the latter. In this figure, the ridges of the folds and the contours of the facets represented are those of the sheets of pliable material 11 and 12 which are formed. Each of them respectively covers the folds and contours of the motive structure used.

Figure 9:
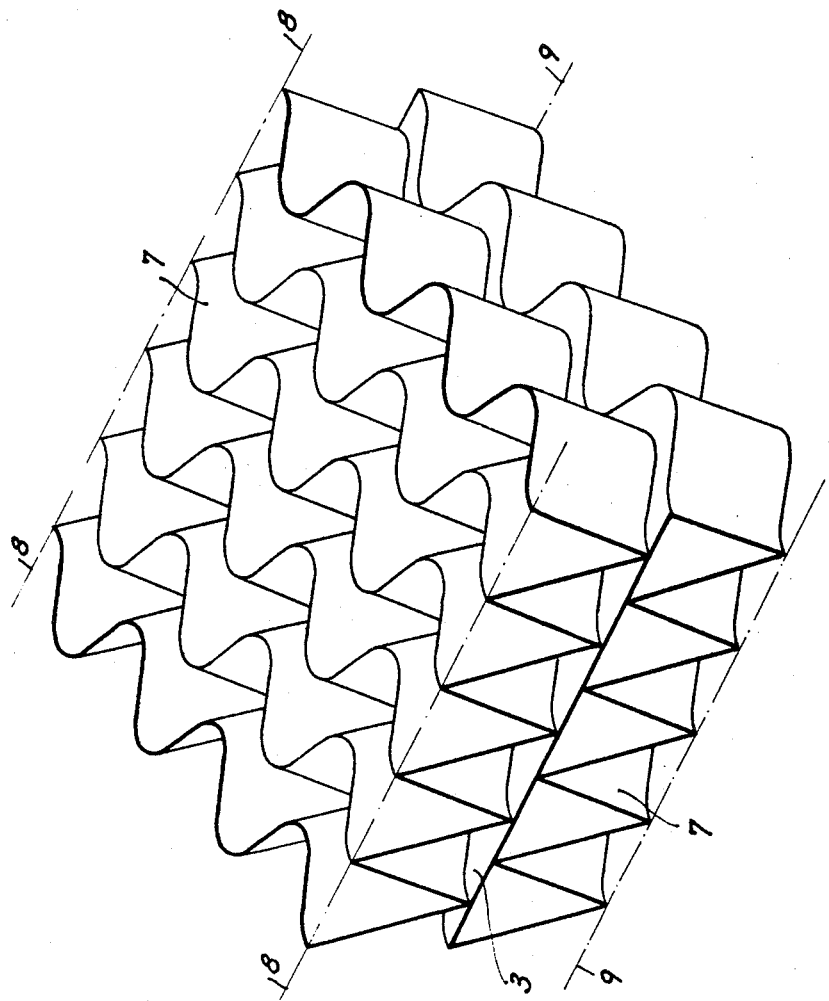
FIGS. 9 and 10 represent in perspective, before and after vacuum contraction, respectively, an assembly of two motive structures between which has been directly placed the sheet of material to be formed.
Figure 10:
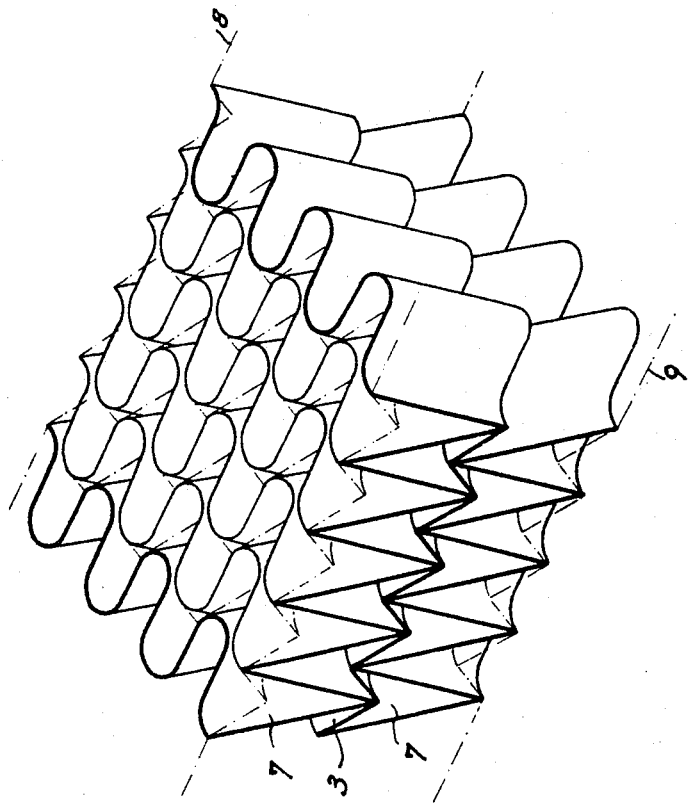

FIGS. 9 and 10 show what happens when, in the arrangements shown in FIGS. 6 and 7, the molding sandwich A consisting of the two molding structures 1 and 2 and bag 4, 5 are replaced, between the motive structures 7 in bag 8, 9, by the pliable sheet 3 to be chevroned which was located between them. The final result is the same: sheet 3 is properly chevroned. Nevertheless, molding stuctures 1, 2 being insufficient, it is important, in order to ensure the accuracy of the chevroning of pliable sheet 3, that the two motive structures 7 be in perfect condition for useful contraction and correctly positioned with respect to each other at the moment atmospheric pressure begins to exert its force.

Figure 11:
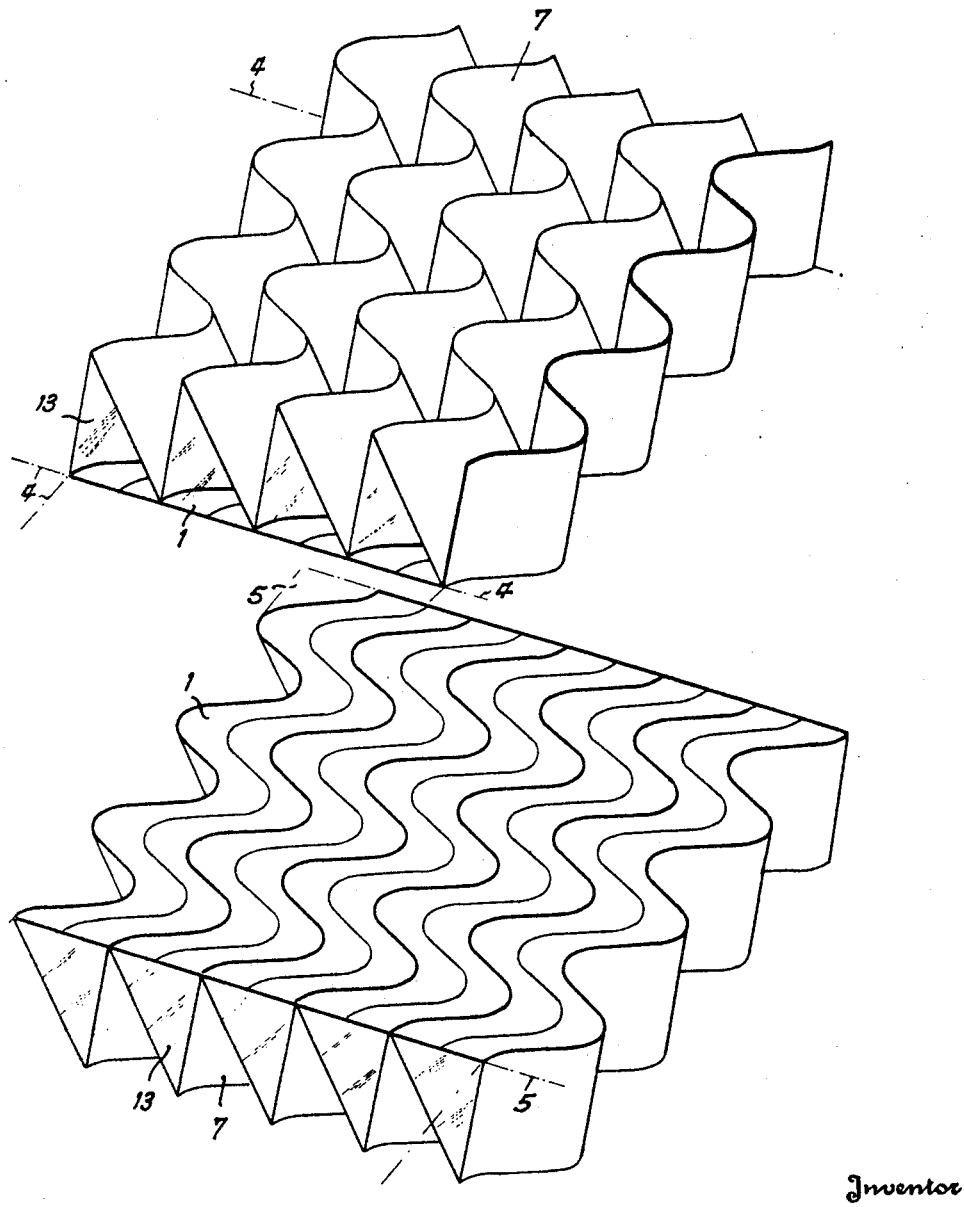

In FIG. 11, two closed caissons facing each other can be seen. Each of them is constituted by combining a molding structure 1 identical to one of those which is represented in FIG. 1 and a motive structure 7 identical to the structure represented in FIG. 3. As was previously explained, the ridges of each flattened structure 1 coincide with those of the corresponding structure 7 when the latter is at a certain stage of contraction. In the two caissons, this peculiarity has been exploited to weld together the ridges of the two structures 1 and 7 along the entire length of their line of contact so that they cannot separate from each other. The lateral triangular spaces have been blocked off by a sheet of flexible plastic material 13 so that the two caissons are hermetically closed. Each of the two caissons is fixed to one of the two sheets 4 and 5 of the bag in such a manner that its molding structure 1 adheres to it over its entire surface.

FIG. 12 represents the appearance that these two same caissons assume when a partial vacuum has been created between their various folds. For each of these caissons, the entire assembly of the molding structure 1 and the motive structure 7 which have common ridges has contracted while chevroning with tangent folds its two opposite faces as well as the sheet 4 or 5 of the bag which adheres to the face facing toward the inside.

Figure 13:
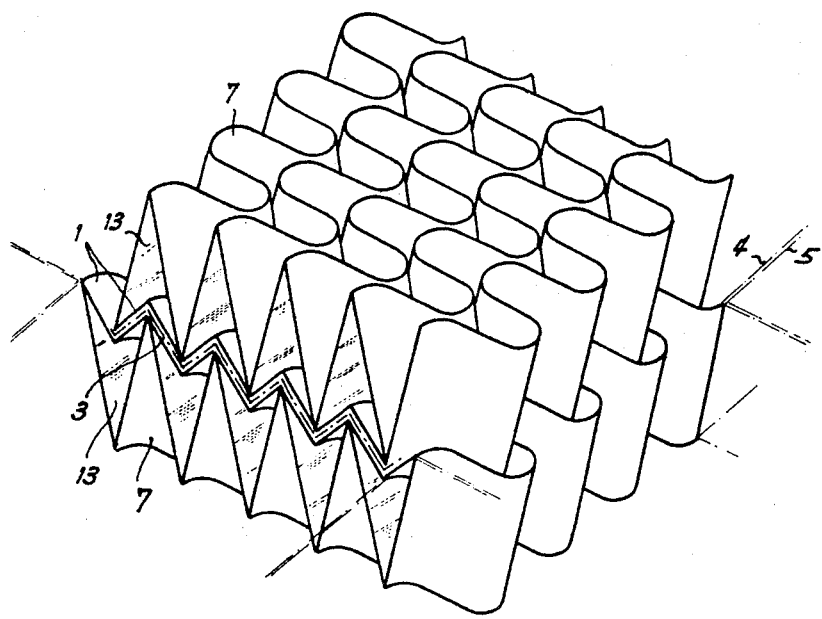
FIG. 13 represents the assembly consisting of the two stretchable boxes of FIGS. 11 and 12 at the end of the chevroning operation.

Naturally, by replacing the vacuum by a pressure exerted inside the caissons, the chevroning of the faces decontracts and the entire assembly reassumes exactly the appearance represented in FIG. 11 since the molding structure 1 which has been flattened out limits by the position of its ridges a more accentuated extension of the motive structure. By bringing the two thus decontracted caissons together after having inserted between them the sheet of pliable material to be formed and by applying the vacuum between them after having sealed the sheets at their edges as indicated previously, an assembly comparable to that shown in FIG. 6 is obtained, without however outside bag 8, 9. It suffices to replace the limited pressure which exists in each of the two caissons by a progressively increasing vacuum in order for the folds of the assembly to contract into the form represented in FIG. 13 while forming between them the sheet 3 to be chevroned.

To disengage sheet 3 when its chevroning is completed, it is necessary, while maintaining the contracted state of the caissons, to eliminate the vacuum existing between the two sheets 4, 5 of the bag and to separate them from each other. To put the assembly back in condition for allowing the insertion of a new sheet to be chevroned, it suffices to again replace the vacuum inside the caissons by a moderate pressure.

Figure 14:
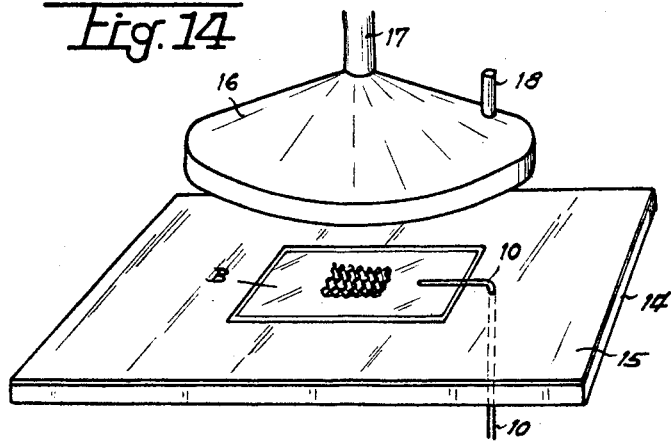
FIG. 14 represents a pressure caisson inside of which can be seen before closing a chevroning assembly identical to that of FIG. 6.

FIG. 14 schematically represents a very simple compression device inside of which it is possible to subject the forming assemblies described above to the effect of air pressure. This device comprises a rigid table 14 covered with a sheet of fluid-tight and flexible material 15 which can be rubber. The forming assembly B which must be subjected to an external air pressure is placed on the table and the inside space of the bag which envelops it is connected to the outside by a tube 10 which passes through the sheet of rubber 15 and table 14 in a fluid-tight manner. Tube 10 can be connected, as desired, either to a vacuum pump or simply left in communication with the atmosphere. Above the assembly is placed a bell 16 which is arranged so as to generously cover the assembly to be formed B and which has a flat peripheral edge capable of being applied in a fluid-tight manner (with the interposition of a gasket if necessary) on the rubber sheet of the table. This bell contains a rod 17 at its top which makes it possible to maneuver its descent and serves to immobilize the bell in the fluid-tight position regardless of the air pressure which is applied inside. Bell 16 has a tube 18 passing through it through which can be admitted into the closed space existing around the chevroning assembly B the useful air pressure coming from any source of compressed air. When the pressure has produced its effect, the inside of the bell is returned to atmospheric pressure. It is then raised and the contracted chevroned assembly is extratced from it and opened up to disengage the formed structure from its folds.

Figure 15:
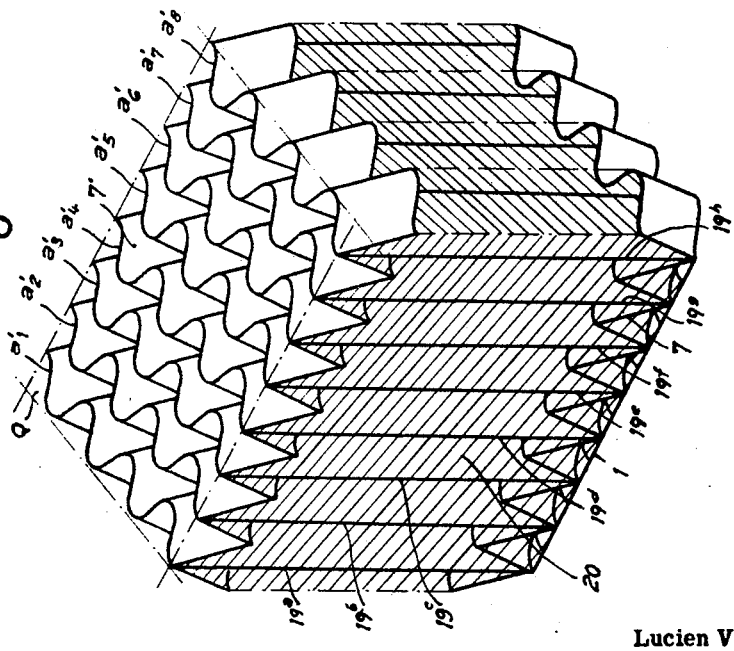
FIG. 15 represents in perspective a deformable caisson reinforced inside with flexible undulated median strips.

FIG. 15 represents a variation in the exceution of the upper deformable caisson of the chevroning assembly represented in FIGS. 11 and 12. This variation, which is intended for the case where it is necessary to have a relatively large forming force, comprises the use of transversely flexible undulated strips for transmitting all along the ridge lines of the sheet to be formed the thrust forces that are necessary for the formation of folds, whether these forces be exerted by atmospheric pressure or by the pressure of a fluid, as was indicated in the description of the process illustrated by FIGS. 11 and 12, or whether they be exerted by the action of a direct mechanical thrust, for example between the two platens of a press.

The caisson represented by FIG. 15 comprises the following peculiarities: motive structure 7 which is combined with molding structure 1 constitutes an assembly identical to the upper caisson in FIGS. 11 and 12, but with this assembly are combined transversely flexible undulated strips, made of metal for example, 19a, 19b, 19c, etc., whose lower sections occupy the median undulated space located above the concave ridge folds of the molding structure 1, i.e., above the ridge lines along which are hollowed out the concave folds of the strucutre to be formed in the sheet. These strips therefore occupy a position which is and remains perpendicular to the mean plane of the molding structure 1 and the motive structure 7. They are therefore parallel to each other, equidistant and of the same length.

In order for these strips to remain in this position under the thrust forces which they will have to withstand, their upper section has been inserted inside the concave folds of a motive structure 7' which has been represented identical to motive structure 7 and of the same dimensions as the latter, but which could just as well have a different facet height though, of course, the ridge lines would have to be capable of coinciding with those of structures 1 and 7 of the caisson.

By covering the four side faces of the assembly thus constituted with a film of flexible plastic material as non-stretchable as possible, shown at 20 by cross-hatching, and by being careful to connect the various interior spaces to each other by perforations (not represented) provided in strips 19, we have a new deformable fluid-tight caisson which behaves in operation exactly in the same manner as the upper caisson in FIGS. 11 and 12, except that it is reinforced with thrust transmission strips all along the ridge lines of molding structure 1.

By fixing the lower face 1 of this caisson onto one of the two sheets of a bag of plastic material of the same type as that outlined at 4, 5 in FIGS. 11 and 12 and by fixing in the same way on the second sheet of this bag the corresponding face of a second reinforced caisson, similar to the first but turned 180°, we have a reinforced chevroning assembly.

When after having inserted the sheet of material to be formed between the two parts of such an assembly, the vacuum between the two sheets of the bag is created so that the two molding structures 1 are flattened out under the effect of a moderate air pressure, the chevroning operation can begin. It takes place as soon as the pressure inside the two fluid-tight caissons is replaced by a progressive vacuum. Under the action of atmospheric pressure, the folds of motive structure 7 of the two caissons contract by pushing against and parallel to each other, the strips of which they are reinforced.

This arrangement, it goes without saying, makes it possible to impart to the ridges of folds to be formed in the sheet a thrust which is practically as great as desired. Under this thrust, strips 19 actually cannot buckle since the forces are transmitted through their material exactly along the median fiber of their undulated cross-section. Taking into account the rigidity of these strips, it is possible, by applying on plane Q of outside ridges $a'1$, $a'2$, $a'3$, $a'4$, etc. of auxiliary motive structure 7' of each of the two caissons which face each other a direct mechanical force in the opposite direction, to transmit to the lines of concave folds of the sheet to be formed a chevroning thrust which is, at least in principle, as great as desired.

Figure 16:
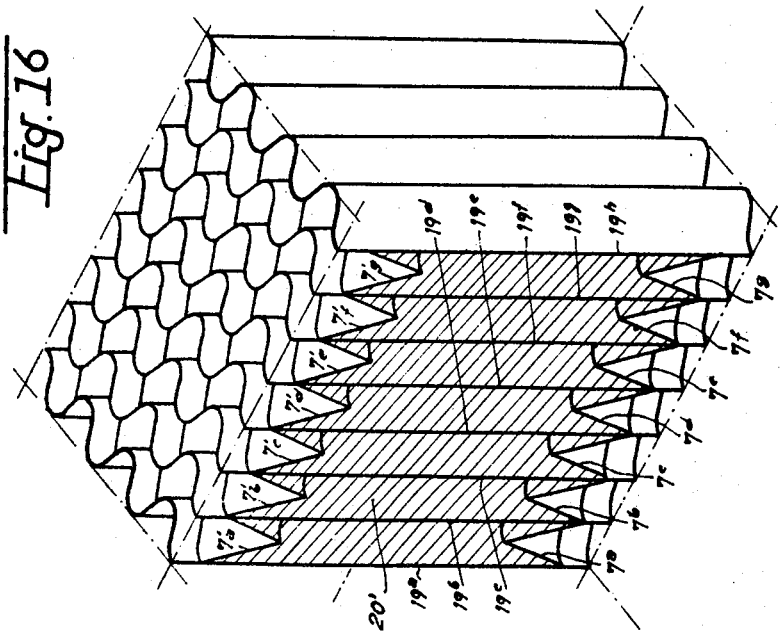
FIG. 16 is a similar view of a deformable caisson reinforced inside with flexible undulated median strips whose leading edges protrude in the form of ridge lines outside of the motive structures.

In practice, the metal reinforcements being located inside the caissons, it is the material of the molding (or motive) structures which, interposed under the section of strips, transmits the folding forces. This imperfect state of affairs can easily be corrected by making the caissons as represented in FIG. 16, so that it is the section of strips 19 which receives and transmits directly the thrust forces. In this case, structures 7 and 7' are naturally cut by strips 19 along the entire length of their ridge lines and the caisson is in effect no longer anything but a group of strips connected to each other and articulated by portions of structures limited to two of their consecutive facets.

In this form of execution of FIG. 16, strips 19a, 19b, 19c, etc. have the same transverse form as the strips represented in FIG. 15 but they are longer. They are connected to each other by the furrows of structures 7a, 7b, 7c, etc., 7'a, 7'b, 7'c, etc., whose edges of undulated ridges are fixed to either side of the said strips by means of a line of cement which can be for example of the nature of the rubber of a well-determined quality which is used for making the well-known flexible bonds between metal parts known as "silent blocks." The assembly of strips connected together in this manner can be put in the form of a fluid-tight casing by covering the two parallel side faces which limit the width of the strips and the furrows of the facets by sheets 20' of non-stretchable plastic material.

It is possible, by interposing a sheet of pliable material to be chevroned between the sections of the strips of two assemblies of this type suitably offset with respect to each other, to obtain a proper chevroning without difficulty, regardless of the thickness or pliability of the sheet if, while the folds of the caissons are contracting as explained above, the coordinated action of the two platens of a press is exerted on either side of their faces on the external sections of the strips which protrude from them.

The only complication which must be faced is due to the fact that during the process of the chevroning, the spaces comprised between the consecutive internal sections of the strips become smaller, whereas the spaces comprised between the external sections of the same strips are immobilized since, on either side, they are in contact under-pressure with the two platens of the press. Any progression of the chevroning which produces a certain gathering of the sections of the strips which are contact with the concave ridge lines of the sheet of material being formed therefore has the effect of destroying the parallelism of the strips and, consequently, of affecting the accuracy of the chevroning, all the more seriously, moreover, the more pronounced the progression is.

Two ways are contemplated of remedying this defective state of affairs.

The first consists in using strips which are so high that, taking into account the limited extent of the sheet of material to be chevroned, their gathering at the point of forming does not affect in a substantial manner the accuracy of the forms despite the fact that they are maintained at a constant spacing because of their contact with the two platens of the press.

The second consists of proceeding with the forming process in successive stages by limiting, during each of these, the travel of the two platens of the press toward each other to what is necessary to push the folds in sufficiently to exceed the elastic limit of the material and leave an appreciable permanent deformation. Between each of the successive stages of the actual progression thus realized, the two platens of the press are separated so as to break the contacts which exist on the thrust section of the strips. Under the effect of the vacuum which is maintained inside the caisson, the latter are therefore caused to reassume the parallel position which they had momentarily lost.

By pushing the vacuum inside the caisson a little further than is necessary to make the strips parallel, it is possible to produce a more accentuated gathering of the thrust sections of the strips which has the effect, taking into account the fact that the opposite leading sections of the strips are immobilized at the bottom of the hollows of the furrows already roughed out, of giving in advance to the combination of them, a parallelism defect which is the reverse of the preceding one. By exploiting this "initial" defect, the action of the leading sections produces on the sheet a chevroning which, as unequal as it is at the first contact, becomes perfect when the operation is interrupted because at this moment, the strips have become strictly parallel to each other. The determination in advance of the amount of false parallelism to be given to the strips can be easily determined through practice as a function of the nature of the material to be formed.

It should be noted that the caisson represented in FIG. 16 does not comprise a molding structure. In this case, the latter is no longer of any substantial interest since the forming action is limited to the leading edge of the flexible strips. In this embodiment, the linkages between the consecutive strips are provided, as was explained above, by the furrows of two consecutive facets of structure, adhering to each other in a flexible manner on their undulated faces.

It would be possible, if the need were felt, to add, by way of reinforcement, between consecutive strips of the caissons, articulation flaps made in the image of the facets but limited in width to the length of the inflection line which, between two opposed curves of the strips, makes it possible to incorporate articulation pivot pins.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for forming a chevroned structure from a sheet of pliable material by means of a deformable assembly, said chevroned structure having a succession of alternate protrusions and recesses, the walls of each such protrusion and recess being composed exclusively of elementary surfaces joining each other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°, said chevroned structure being of such configuration that, if expanded into planar form, the sheet is completely developable on the plane to which it is expanded, said deformable assembly comprising a structure which is contractible from a more to a relatively less developed condition, which is chevroned as above defined and the ridge lines of which have the same shape as the ridge lines of the chevroned structure to be formed, said process comprising:
 (1) placing said sheet of pliable material against the face of at least one deformable assembly which is in a lesser state of development than said pliable material but alternate ridge lines of which coincide with concave alternate ridge lines to be formed on one side of said sheet of pliable material so that the ridge lines of the contractible chevroned structure of said deformable assembly are more greatly separated from the mean plane of said contractible chevroned structure than are the ridge lines of the sheet of pliable material, and
 (2) causing said contractible chevroned structure to contract while said sheet of pliable material is still positioned against its face, said contraction resulting in the movement of the surface of said sheet of pliable material along all three of its geometric axes.

2. A process as defined in claim 1 wherein said deformable assembly and said sheet of pliable material positioned against its face are placed in a container of flexible material, the pressure in said container being reduced sufficiently relative to the pressure outside the chamber so that the pressure outside the container causes said container to contract about said deformable assembly and, in turn, to cause the latter to contract.

3. A process for forming a chevroned structure from a sheet of pliable material by means of a plurality of deformable assemblies, said chevroned structure having a succession of alternate protrusions and recesses, the walls of each such protrusion and recess being composed exclusively of elementary surfaces joining each other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°, said chevroned structure being of such configuration that, if expanded into planar form, the sheet is completely developable on the plane to which it is expanded, each of said deformable assemblies comprising a structure which is contractible from a more to a relatively less developed condition, which is chevroned as above defined and the shape of the ridge lines of which is the same as the shape of the ridge lines of the chevroned structure to be formed, said process comprising:
 (1) sandwiching said sheet of pliable material between the contractible chevroned structures of said two deformable assemblies so that:
  (a) the ridge lines of the contractible chevroned structure of one of said deformable assemblies coincide with concave ridge lines to be formed on one side of said sheet of pliable material and the ridge lines of the contractible chevroned structure of the other of said deformable assemblies coincide with concave ridge lines to be formed on the other side of said sheet of pliable material, and
  (b) so that the ridge lines of each of the contractible chevroned structures of said deformable assemblies are more greatly separated from the mean plane of said contractible chevroned structure than are the ridge lines of the sheet of pliable material, and
 (2) causing both of said contractible chevroned structures to contract while said sheet of pliable material is sandwiched between them, said contraction resulting in the movement of the surface of said sheet of pliable material along all three of its geometric axes.

4. A process as defined in claim 3 wherein positioned against each side of said sheet of pliable material and between said deformable assemblies is a molding structure comprising a chevroned structure substantially identical to said chevroned structure to be formed but which is in substantially developed form.

5. A process as defined in claim 3 wherein said sheet of pliable material with said two deformable assemblies sandwiched about it are positioned between the two opposed platens of a press in such a way that the ridge lines of the outside face of each contractible chevroned structure faces one of said platens, and wherein a mechanical thrust is applied to said deformable assemblies by said press for at least a portion of said forming operation.

6. A process for forming a chevroned structure from a sheet of pliable material by means of a plurality of deformable assemblies, said chevroned structure having a succession of alternate protrusions and recesses, the walls of each such protrusion and recess being composed exclusively of elementary surfaces joining each other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°, said chevroned structure being of such configuration that, if expanded into planar form, the sheet is completely developable on the plane to which it is expanded, each of said deformable assemblies comprising a molding structure and a contractible chevroned structure, said molding structure being substantially identical in configuration to said chevroned structure to be formed, said contractible chevroned structure being contractible from a more to a relatively less developed condition and being chevroned as above defined, said contractible chevroned structure having ridge lines the shape of which is the same as the shape of the ridge lines of the chevroned structure to be formed, said molding structure and said contractible chevroned structure being secured to one another along alternating coinciding ridge lines and forming together a closed chamber, the ridge lines of said contractible chevroned structure being more greatly separated from its mean plane than are the ridge lines of said molding structure from its mean plane, said process comprising:

(1) sandwiching said deformable assemblies about said sheet of pliable material with the molding structure of each of said deformable assemblies being in contact with one of the sides of said sheet so that:

(a) the ridge lines of the contractible chevroned structure of one of said deformable assemblies coincide with concave ridge lines to be formed on one side of said sheet of pliable material and the ridge lines of the contractible chevroned structure of the other of said deformable assemblies coincide with concave ridge lines to be formed on the other side of said sheet of pliable material, and (b) so that the ridge lines of each of the contractible chevroned structures of said deformable assemblies are more greatly separated from the mean plane of said contractible chevroned structure than are the ridge lines of the sheet of pliable material, and (2) causing the contractible chevroned structures to contract while said sheet of pliable material is positioned between said deformable assemblies, said contraction resulting in the movement of the surface of said sheet of pliable material along all three of its geometric axes.

7. A process for forming chevroned structures from sheets of pliable material by means of a deformable assembly, said chevroned structure having a succession of alternate protrusions and recesses, the walls of each such protrusion and recess being composed exclusively of elementary surfaces joining each other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°, said chevroned structure being of such configuration that, if expanded into planar form, the sheet is completely developable on the plane to which it is expanded, said deformable assembly comprising a structure which is contractible from a more to a relatively less developed condition, which is chevroned as above defined and the ridge lines of which have the same shape as the ridge lines of the chevroned structure to be formed, said process comprising:

(1) placing one such sheet of pliable material against each of two faces of at least one such deformable assembly with ridge lines of the contractible chevroned structure of said deformable assembly coinciding with alternate ridge lines of the chevroned structure to be formed from each sheet of pliable material and with the ridge lines of said contractible chevroned structure being more greatly separated from its mean plane than are those of said sheets of pliable material, and (2) causing said contractible chevroned structure to contract while said sheets of pliable material are still positioned against its folds, said contraction resulting in the movement of the surface of said sheets of pliable material along all three of their geometric axes.

8. Apparatus for forming a chevroned structure from a sheet of pliable material, said chevroned structure having a succession of alternate protrusions and recesses, the walls of each such protrusion and recess being composed exclusively of elementary surfaces joining each other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°, said chevroned structure being of such configuration that, if expanded into planar form, the sheet is completely developable on the plane to which it is expanded, comprising (1) a structure which is contractible from a more to a relatively less developed condition and which is chevroned as above defined, (2) flexible container means into which said contractible chevroned structure is adapted to be received with said sheet of pliable material positioned against its face, and (3) means to reduce the pressure in said container means relative to the pressure outside said container means sufficiently so that the pressure outside the container means causes said container means to contract about said contractible chevroned structure and, in turn, to cause the latter to contract from said more to said relatively less developed condition.

9. A deformable assembly for use in forming a chevroned structure from a sheet a pliable material, said chevroned structure having a succession of alternate protrusions and recesses, the walls of each such protrusion and recess being composed exclusively of elementary surfaces joining each other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°, said chevroned structure being of such configuration that, if expanded into planar form, the sheet is completely developable on the plane to which it is expanded, comprising (1) a molding structure and (2) a structure which is contractible from a more to a relatively less developed condition and which is chevroned as above defined, the ridge lines of both said molding structure and said contractible chevroned structure coinciding with those of the chevroned structure to be formed, the ridge lines of said contractible chevroned structure being more greatly separated from its mean plane than are those of the sheet of pliable material, said molding structure being substantially identical to said chevroned structure to be formed and being in substantially developed form, said molding structure and said contractible chevroned structure being secured to one another along alternate coinciding ridge lines and forming together a closed chamber.

10. A deformable assembly as defined in claim 9 additionally including means for applying a mechanical thrust in a direction substantially perpendicular to the mean plane of said contractible chevroned structure at points coinciding with alternate ridge lines of said contractible chevroned structure.

11. A deformable assembly as defined in claim 10 wherein said mechanical thrust means comprises a plurality of substantially parallel, longitudinally rigid, thrust elements each of whose cross sections corresponds substantially to the shape of a ridge line of said contractible chevroned structure and which elements are positioned so as to coincide with alternate ridge lines on said contractible chevroned structure, said thrust elements being transversely flexible so as to be capable of assuming at any given instant the changing profile of the ridge line with which it is associated.

12. A deformable assembly as defined in claim 11 additionally comprising means to maintain said thrust elements in substantial parallelism with one another; said parallelism-maintaining means comprising a second contractible chevroned structure which is secured to said thrust elements at points remote from the points at which said thrust elements coincide with the alternate ridge lines on said first-mentioned contractible chevroned structure.

13. Apparatus for use in forming a chevroned structure from a sheet of pliable material, said chevroned structure having a succession of alternate protrusions and recesses, the walls of each such protrusion and recess being composed exclusively of elementary surfaces joining each other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°, said chevroned structure being of such configuration that, if expanded into planar form, the sheet is completely developable on the plane to which it is expanded, comprising (1) a plurality of deformable assemblies, each such deformable assembly comprising a structure which is contractible from a more to a relatively less developed condition and which is chevroned as above defined, the ridge lines of said contractible chevroned structure coinciding with those of the chevroned structure to be formed by being more greatly separated from the mean plane of said contractible chevroned structure than are those of the sheet of pliable material, the ridge lines of one of said deformable assemblies coinciding with convex ridge lines to be formed on one side of said sheet of pliable material and the ridge lines of the other of said deformable assemblies coinciding with concave ridge lines to be formed on the other side of said sheet of pliable material, (2) flexible container means capable of receiving said deformable assemblies while they are sandwiched about said sheet of pliable material, and (3) means for reducing the pressure in said container means relative to the pressure outside of said container means.

14. Apparatus as defined in claim 13 additionally comprising a plurality of molding elements each comprising a chevroned structure substantially identical to said chevroned structure to be formed and whose ridge lines, when it is in a state of development greater than that of said contractible chevroned structures, coincide with those of said contractible chevroned structures.

15. Apparatus as defined in claim 14 additionally comprising second flexible container means capable of receiving said plurality of molding elements while they are sandwiched about said sheet of pliable material, and means for reducing the pressure in said second container means relative to the pressure outside of said second container means.

16. Apparatus for use in forming a chevroned structure from a sheet of pliable material, said chevroned structure having a succession of alternate protrusions and recesses, the walls of each such protrusion and recess being composed exclusively of elementary surfaces joining each of other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°, said chevroned structure being of such configuration that, if expanded into planar form, the sheet is completely developable on the plane to which it is expanded, comprising (1) a plurality of deformable assemblies, each such deformable assembly comprising (a) a molding structure (b) a structure which is contractible from a more to a relatively less developed condition and which is chevroned as above defined, the ridge lines of both of said molding and contractible chevroned structures coinciding with those of the chevroned structure to be formed, the ridge lines of said contractible chevroned structure being more greatly separated from its mean plane than those of the sheet of pliable material, said contractible chevroned structure being contractible from a more to a relatively less developed condition, said molding structure being substantially identical to said chevroned structure to be formed and being in substantially developed form, said molding structure and said contractible chevroned structure being secured to one another along alternate coinciding ridge lines and forming together a closed chamber, (2) flexible container means capable of receiving said deformable assemblies while they are sandwiched about said sheet of pliable material, and (3) means for reducing the pressure in said container means relative to the pressure outside of said container means.

17. Apparatus as defined in claim 16 additionally including a second flexible container means capable of receiving the pliable sheet to be chevroned, the molding structure of one of said contractible chevroned structures being fixed to one side of said second container means and the molding structure of the second of said contractible chevroned structures being fixed to an opposing side of said second container means, and means for reducing the pressure in said second container means relative to the pressure outside said seocnd container means.

18. A deformable assembly for use in forming a chevroned structure from a sheet of pliable material, said chevroned structure having a succession of alternate protrusions and recesses, the walls of each such protrusion and recess being composed exclusively of elementary surfaces joining each other in an undulatroy manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°, said chevroned structure being of such configuration that, if expanded into planar form, the sheet is completely developable on the plane to which it is expanded, comprising (1) a structure which is contractible from a more to a less developed condition and which is chevroned as above defined, the ridge lines of said contractible chevroned structure, when it is in a state of development less than that of the chevroned structure to be formed, coinciding with the ridge lines of said chevroned structure to be formed, and (2) a plurality of substantially parallel, longitudinally rigid thrust elements each of whose cross sections corresponds substantially to the shape of a ridge line of said contractible chevroned structure and which elements are positioned so as to coincide with alternate ridge lines on said contractible chevroned structure, said thrust elements being transversely flexible so as to be capable of assuming at any given instant the changing profile of the ridge line with which it is associated, said thrust elements and said contractible chevroned structure together forming a closed chamber, the ends of said thrust elements extending beyond the ridge lines of said contractible chevroned structure.

19. A deformable assembly as defined in claim 18 wherein means are provided to maintain said thrust elements in substantial parallelism with one another, said last-mentioned means comprising a second contractible chevroned structure which is secured to said thrust elements at points remote from the points at which said thrust elements coincide with the alternate ridge lines on said first-mentioned contractible chevroned structure.

20. Apparatus for forming a chevroned structure from a sheet of pliable material, said chevroned structure having a succession of alternate protrusions and recesses, the walls of each such protrusion and recess being composed exclusively of elementary surfaces joining each other in an undulatory manner at the ridges of said protrusions and recesses along a single line having a plurality of points at which it changes direction to form a plurality of undulations and at each of which points border lines of at least four of said elementary surfaces converge, said surfaces being ruled in a direction extending from one ridge line to another, the sum of the angles formed on said surfaces between said border lines at each of said points being equal to 360°, said chevroned structure being of such configuration that, if expanded into planar form, the sheet is completely developable on the plane to which it is expanded, comprising (1) a deformable assembly which itself comprises a structure which is contractible from a more to a relatively less developed condition and which is chevroned as above defined, the ridge lines of said contractible chevroned structure coinciding with those of the chevroned structure to be formed but being more greatly separated from the mean plane of said contractible chevroned structure than are those of the sheet of pliable material, (2) a container of flexible material capable of receiving said deformable assembly with said sheet of pliable material positioned against the face of such assembly, (3) a pressure chamber capable of receiving said container of flexible material with said deformable assembly and sheet of pliable material in it as above stated, and (4) means to increase the pressure in said pressure chamber above the pressure in said container so as to cause the pressure outside said container to cause said container to contract about said deformable assembly and, in turn, to cause the latter to contract.

References Cited
UNITED STATES PATENTS

| | | | |
|---|---|---|---|
| 2,141,432 | 12/1938 | Haas | 264—285 |
| 2,668,327 | 2/1954 | Steele | 264—339 |
| 2,742,387 | 4/1956 | Giuliani | 154—110 |
| 2,919,472 | 1/1960 | Steele | 264—339 |
| 2,963,128 | 12/1960 | Rapp | 189—34 |
| 3,004,295 | 9/1961 | Bottoms | 264—316 |
| 3,021,569 | 2/1962 | Lyman | 264—90 |
| 3,067,507 | 12/1962 | Titus | 27—471.1 |
| 3,146,148 | 8/1964 | Mitchella | 260—90 |
| 3,170,471 | 2/1965 | Schnitzer | 135—1 |

ROBERT F. WHITE, *Primary Examiner.*

R. R. KUCIA, *Assistant Examiner.*